United States Patent
Patrick et al.

(10) Patent No.: US 11,950,531 B1
(45) Date of Patent: Apr. 9, 2024

(54) TRIMMER ATTACHMENT FOR LAWN MOWER

(71) Applicant: CoJa Industries, LLC, Weatherford, TX (US)

(72) Inventors: James Patrick, Weatherford, TX (US); Cody Armstrong, Azle, TX (US)

(73) Assignee: CoJa Industries, LLC, Weatherford, TX (US)

( * ) Notice: Subject to any disclaimer, the term of this patent is extended or adjusted under 35 U.S.C. 154(b) by 139 days.

(21) Appl. No.: 17/220,440

(22) Filed: Apr. 1, 2021

(51) Int. Cl.
*A01D 43/16* (2006.01)
*A01D 34/416* (2006.01)
*A01D 34/84* (2006.01)
*A01D 101/00* (2006.01)

(52) U.S. Cl.
CPC .......... *A01D 43/16* (2013.01); *A01D 34/416* (2013.01); *A01D 34/84* (2013.01); *A01D 2101/00* (2013.01)

(58) Field of Classification Search
CPC ....... A01D 34/84; A01D 34/416; A01D 43/16
See application file for complete search history.

(56) References Cited

U.S. PATENT DOCUMENTS

| | | | | |
|---|---|---|---|---|
| 2,622,384 A | * | 12/1952 | Velotta | A01D 43/16 56/2 |
| 2,721,432 A | * | 10/1955 | Machovec | A01G 3/062 56/255 |
| 2,771,730 A | * | 11/1956 | True | A01D 34/43 56/13.7 |
| 3,236,037 A | * | 2/1966 | Porterfield | A01G 3/062 56/16.9 |
| 3,693,334 A | * | 9/1972 | Lowery | A01D 43/16 56/16.9 |
| 3,782,085 A | * | 1/1974 | Parker | A01G 3/062 56/16.9 |
| 4,170,099 A | * | 10/1979 | Owens | A01D 43/16 56/13.6 |
| 4,718,221 A | * | 1/1988 | Wessel | A01D 34/84 56/16.9 |
| 5,040,360 A | * | 8/1991 | Meehleder | A01D 34/27 56/13.7 |
| 5,107,665 A | * | 4/1992 | Wright | A01G 3/062 30/276 |
| 6,094,896 A | * | 8/2000 | Lane | A01D 34/001 56/13.7 |
| 6,474,053 B1 | * | 11/2002 | Lund | A01D 43/16 56/13.7 |

(Continued)

FOREIGN PATENT DOCUMENTS

DE 19740660 A1 3/1999
FR 2940746 B1 2/2011

(Continued)

*Primary Examiner* — Thomas B Will
*Assistant Examiner* — Julia C Tran
(74) *Attorney, Agent, or Firm* — James E. Walton (57) ABSTRACT

A trimmer attachment for use with a lawn mower includes a deck mounting plate configured for attachment to the lawn mower, one or more mounting tabs extending up from the deck mounting plate, a curved pivoting arm rotatably coupled to the one or more mounting tabs, a pivoting motor for rotating the pivoting arm, and a trimmer head coupled to the pivoting arm. Rotation of the pivoting arm by the pivoting motor causes the trimmer head to rotate between a stowed position and an engaged position.

13 Claims, 9 Drawing Sheets

(56) References Cited

U.S. PATENT DOCUMENTS

| | | | |
|---|---|---|---|
| 6,779,325 B1* | 8/2004 | Robillard, II | A01D 34/82 56/12.7 |
| 6,959,528 B1* | 11/2005 | Scordilis | A01D 34/863 56/15.8 |
| 6,966,168 B1 | 11/2005 | Kerr | |
| 7,165,383 B1* | 1/2007 | Luton, Jr. | A01D 34/84 56/13.7 |
| 7,398,637 B1 | 7/2008 | Sevey | |
| 8,046,980 B1 | 11/2011 | Schroeck | |
| 8,322,121 B1* | 12/2012 | Marcell | A01D 34/84 56/13.6 |
| 8,464,504 B1 | 6/2013 | Huff | |
| 8,621,833 B2 | 1/2014 | Shida | |
| 8,973,343 B2 | 3/2015 | Bell | |
| 9,357,701 B1* | 6/2016 | Bishop | A01G 3/062 |
| 9,386,740 B2 | 7/2016 | Miller | |
| 9,402,350 B2 | 8/2016 | Carroll | |
| 9,510,506 B2 | 12/2016 | Castelli | |
| 9,560,803 B2 | 2/2017 | Kobayashi | |
| 9,730,382 B2 | 8/2017 | Proudlock | |
| 9,820,435 B2 | 11/2017 | Hofmeister | |
| 9,872,432 B1* | 1/2018 | Millikan | H01Q 3/08 343/757 |
| 10,342,175 B2 | 7/2019 | Walmsley | |
| 10,772,259 B2 | 9/2020 | Parker | |
| 2002/0083693 A1 | 7/2002 | Smith | |
| 2002/0129588 A1 | 9/2002 | Handlin | |
| 2002/0174635 A1 | 11/2002 | Mitchell, Jr. | |
| 2003/0070408 A1 | 4/2003 | Keane | |
| 2003/0093983 A1 | 5/2003 | Savard | |
| 2004/0237491 A1 | 2/2004 | Heighton | |
| 2004/0154277 A1 | 8/2004 | Shumate | |
| 2004/0045268 A1 | 11/2004 | Nafziger | |
| 2005/0044834 A1 | 3/2005 | Appleyard | |
| 2005/0102990 A1 | 5/2005 | Bares | |
| 2005/0193699 A1 | 8/2005 | Hatfield | |
| 2006/0021314 A1 | 2/2006 | Hatfeild | |
| 2006/0026938 A1 | 9/2006 | Cartner | |
| 2006/0026940 A1 | 9/2006 | Cartner | |
| 2006/0005520 A1 | 12/2006 | Weidman | |
| 2006/0288679 A1 | 12/2006 | Wright | |
| 2007/0130901 A1 | 6/2007 | McMahan | |
| 2008/0078154 A1 | 3/2008 | Wright | |
| 2008/0158078 A1* | 7/2008 | Allen | H01Q 3/08 343/757 |
| 2008/0216459 A1 | 11/2008 | Spitzley | |
| 2009/0241500 A1 | 1/2009 | Pankey | |
| 2009/0249758 A1 | 8/2009 | Weeden | |
| 2010/0000192 A1 | 1/2010 | Robison | |
| 2010/0071332 A1 | 3/2010 | Pankey | |
| 2010/0223897 A1 | 9/2010 | Mills | |
| 2010/0307011 A1 | 9/2010 | Hurley | |
| 2010/0287780 A1 | 11/2010 | Doane | |
| 2010/0326031 A1 | 12/2010 | Branden | |
| 2010/0326032 A1 | 12/2010 | Leonardl | |
| 2011/0020101 A1 | 1/2011 | Crane | |
| 2011/0179757 A1 | 7/2011 | Scott-Stanbridge | |
| 2011/0214960 A1 | 8/2011 | Bosk | |
| 2011/0131815 A1 | 9/2011 | Hurley | |
| 2011/0232436 A1 | 9/2011 | Morabit | |
| 2011/0056996 A1 | 10/2011 | Schneider | |
| 2012/0061393 A1 | 3/2012 | Okouchi | |
| 2012/0073258 A1 | 3/2012 | Stanley | |
| 2012/0079799 A1 | 5/2012 | Matsunaga | |
| 2012/0086365 A1 | 12/2012 | Rosskemp | |
| 2013/0068493 A1 | 3/2013 | Yamaguchi | |
| 2013/0128043 A1 | 5/2013 | Avnery | |
| 2013/0283752 A1 | 10/2013 | Lister | |
| 2013/0175372 A1 | 11/2013 | Mosman | |
| 2014/0041353 A1 | 2/2014 | MacDonald | |
| 2014/0325850 A1 | 6/2014 | Bone | |
| 2014/0325851 A1 | 6/2014 | Bone | |
| 2014/0325852 A1 | 6/2014 | Walmsley | |
| 2014/0202128 A1 | 7/2014 | Bell | |
| 2014/0208597 A1 | 7/2014 | Zhou | |
| 2014/0123614 A1 | 8/2014 | Hofmeister | |
| 2014/0338299 A1 | 11/2014 | Lowery | |
| 2014/0345242 A1 | 11/2014 | Carroll | |
| 2015/0052867 A1 | 2/2015 | Castelli | |
| 2015/0054464 A1 | 2/2015 | Suzuki | |
| 2015/0085126 A1 | 3/2015 | Avnery | |
| 2015/0101302 A1 | 4/2015 | Cooper | |
| 2015/0113934 A1 | 4/2015 | Crow | |
| 2015/0040529 A1 | 12/2015 | Standridge | |
| 2018/0077861 A1 | 3/2018 | Lego | |

FOREIGN PATENT DOCUMENTS

| | | |
|---|---|---|
| WO | 201852363 A1 | 3/2018 |
| WO | 202063811 A1 | 4/2020 |

* cited by examiner

TRIMMER ATTACHMENT FOR LAWN MOWER

BACKGROUND

1. Field of the Invention

The present application relates to lawn mowers and trimmers. In particular, the present application relates to trimmer attachments for attachment to the decks of riding lawn mowers.

2. Description of Related Art

Lawn mowers and trimmers have been around for many years. Lawn mowers can be made to be pushed by a user, or ridden on by a user. Lawn mowers and trimmers can be made to operate under the power of gas or electricity.

Traditionally, the lawn mower and trimmer are two separate pieces of equipment, with two different intended functionalities. However, there are some combination lawn mower/trimmers. Usually, these combination lawn mower/trimmers are riding mowers in which the trimmer mechanism is either rigidly fixed to the mower deck of the lawn mower or attached to the mower deck by various hinges.

Although great strides have been made in the area of lawn mowers and trimmers, many shortcomings remain.

BRIEF DESCRIPTION OF THE DRAWINGS

The novel features believed characteristic of the present application are set forth in the appended claims. However, the present application itself, as well as a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

Figure 1A:
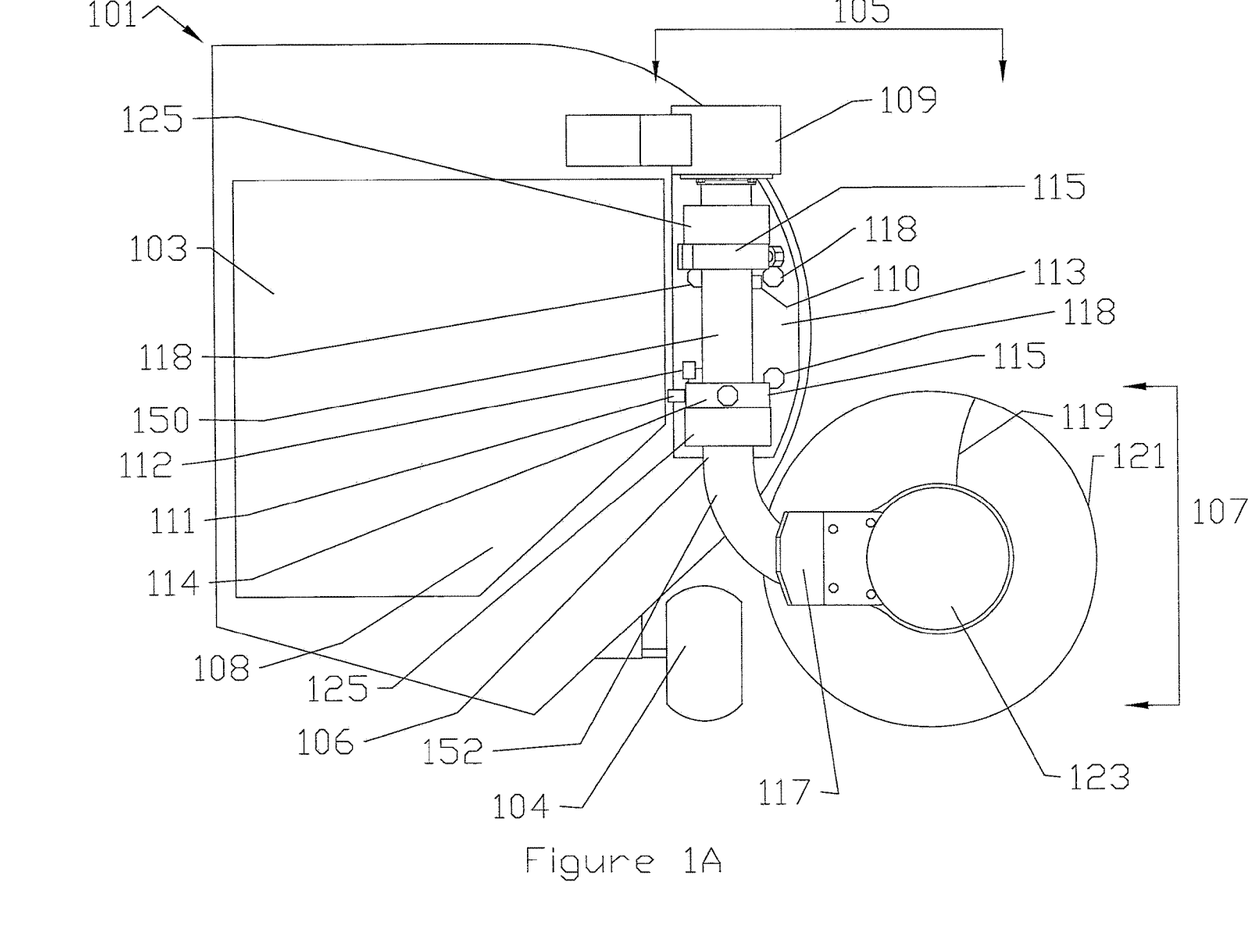
FIG. 1A is a top view of a trimmer attachment for a lawn mower according to a preferred embodiment of the present application.
Figure 1B:
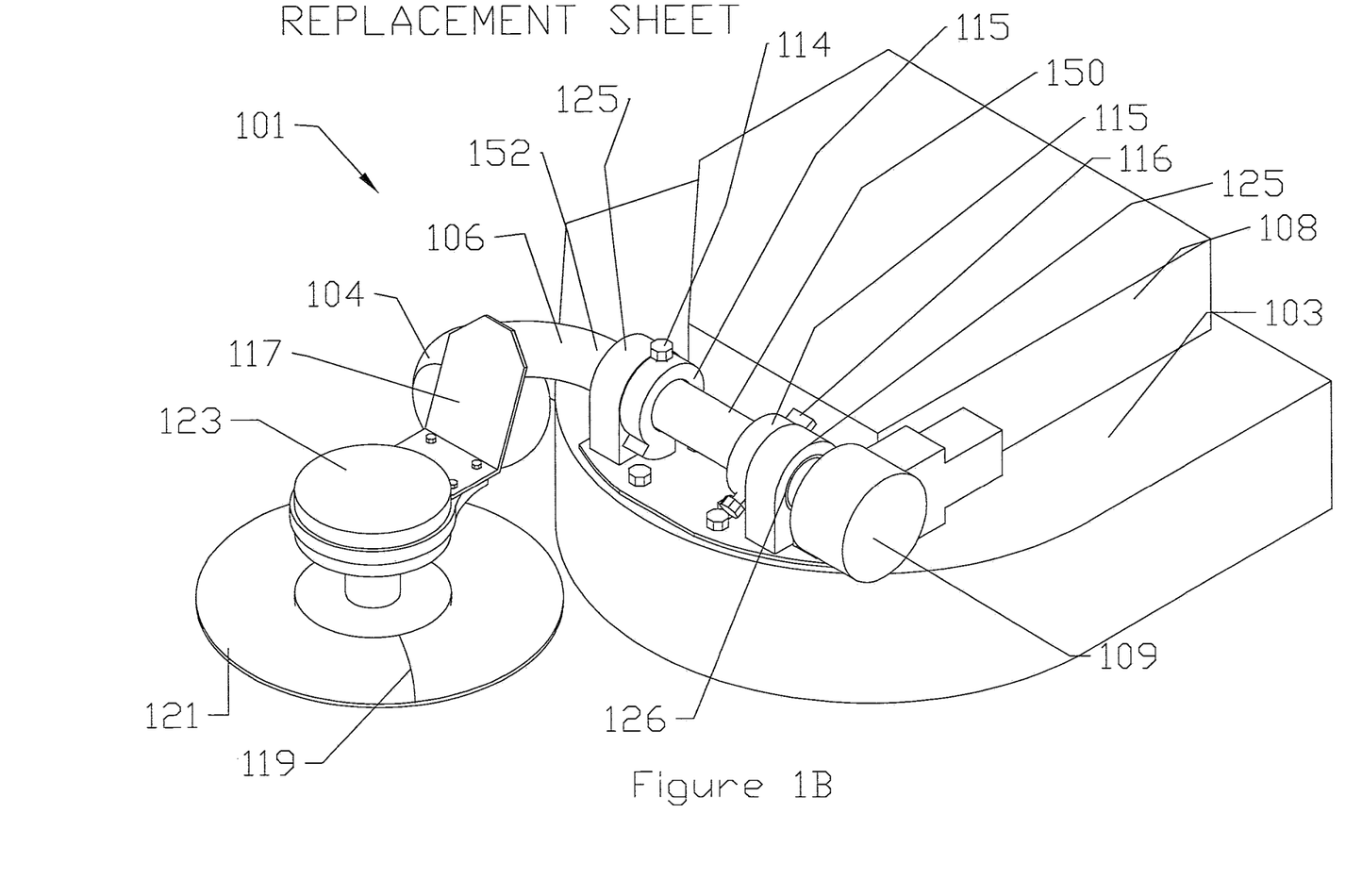
FIG. 1B is a perspective view of the trimmer attachment of FIG. 1A.

Referring now to FIGS. 1A and 1B in the drawings, a preferred embodiment of a trimmer attachment assembly 101 is illustrated. Trimmer attachment assembly 101 includes a trimmer attachment 105 configured for attachment to a mower deck 103. Mower deck 103 is preferably the mower deck of a riding lawn mower. For clarity, only a portion (left-hand side) of mower deck 103 is shown in the figures. It will be appreciated that trimmer attachment 105 may be used in either a retrofit application on existing mower decks, or may be installed on mower decks during original manufacture. Although the present application is described with respect to a trimmer attachment coupled and/or attached to the mowing deck of a lawn mower, it will be appreciated that the trimmer attachments disclosed herein may be attached to other parts and/or components of various types of lawn mowers and other equipment in a multitude of ways.

Mower deck 103 includes at least one guide wheel 104 and at least one spindle cover 108. It will be appreciated that mower deck 103 may come in a wide variety of shapes, sizes, configurations, and may include many different features, including height adjustment mechanisms, blade spindles, pulleys, belts, chains, etc. One particular advantage of trimmer attachment 105, is that, with only minor adjustments, trimmer attachment 105 can be used with almost any type of mower deck 103.

Trimmer attachment 105 includes a deck mounting plate 113, a head mounting plate 117, a pivoting arm 106, a trimmer head 107, an arm motor 109, an optional up limit switch 110, an optional primary limit switch 112, an optional secondary limit switch 111, and one or more locking collars 115. Locking collar 115 includes an adjustment screw 114. Trimmer head 107 includes a trimmer motor 123 and trimmer line 119. A sweep path 121 illustrates the cutting area reachable by trimmer line 119.

In accordance with the preferred embodiment, trimmer attachment 105 is secured to mower deck 103 at deck mounting plate 113. In the preferred embodiment, deck mounting plate 113 is securely fastened to mower deck 103 via bolts 118; however, it will be appreciated that other forms of releasable attachment may be used, such as clamps, straps, pins, etc. In addition, it should be appreciated that deck mounting plate 113 could be attached to mower deck 103 using magnets or other temporary fasteners, such that deck mounting plate can "tear away" from mower deck 103 in the event of collisions with external objects. In certain embodiments, in particular, those embodiments in which trimmer attachment 105 and mower deck 103 are of original manufacture, trimmer attachment 105 may be welded or otherwise permanently attached to mower deck 103.

While deck mounting plate 113 is illustrated as being disposed along the edge of mower deck 103, it should be appreciated that deck mounting plate 113 may be disposed in a variety of positions and locations on mower deck 103. In addition, the location of deck mounting plate 113 relative to mower deck may be adjustable. For example the use of bolts through slots, as opposed to holes, would allow deck mounting plate 113 to translate relative to mower deck 103. In addition, risers, shims, and adapter plates (not shown) may be used to attach deck mounting plate 113 to mower deck 103 if certain components, such as spindles, belts, discharge shoots, etc. are in the way.

According to the preferred embodiment of the present application, locking collar 115 includes one or more limit switch strikers 116 disposed thereon, for contacting limit switches 110, 111, and 112 when the defined limits are reached. It will be appreciated that the size, shape, and configuration of locking collars 115 and limit switch strikers 116 may vary depending upon the desired application and installation. Adjustment screw 114 is preferably disposed on locking collar 115 and allows a user to adjust the location and settings of limit switches 110, 111, and 112. By adjusting limit switches 110, 111, and 112, trimmer attachment 105 is allowed to rotate more or less away from mower deck 103, depending upon the settings of limit switches 110, 111, and 112, One or more mounting tabs 125 preferably include bearings and/or bushings 126, which are operably associated with pivoting arm 106 to ensure that pivoting arm 106 rotates freely relative to mower deck 103.

FIG. 1B best illustrates the preferred position of the up limit switch 110 and the secondary limit switch 111. Limit switches 110, 111, and 112 and are configured such that primary limit switch 112 is used to keep trimmer head 107 at a level cutting position. According to the preferred embodiment, a user may override primary limit switch 112, thereby allowing trimmer head 107 to travel past the limit designated by limit switch 112, in which case, secondary limit switch 111 is activated and provides an alternative limit of travel for trimmer head 107, such that trimmer head 107 is in an over-rotation position.

In certain alternative embodiments, along with the other embodiments disclosed herein, no limit switches are utilized. Instead, locking collars 115 and one or more positive stops (similar to limit switch strikers) may be utilized to limit the travel of pivoting arm 106. The positive stops can be adjusted to whatever positions are desired by the user. One advantage of not using limit switches is that power is not interrupted and the user can adjust the location of pivoting arm 106 at any position between the positive stops.

Arm motor 109 is preferably an articulating motor configured for rotating pivoting arm 106 and trimmer head 107. According to the preferred embodiment, arm motor 109 and trimmer motor 123 are powered by the battery from the mower. However, it should be appreciated that arm motor 109 and trimmer motor 123 may be powered by different sources, such as separate batteries, or may be gas powered, in which gas is draw from the gas tank of the mower.

Pivoting arm 106 has a unique configuration including an elongated shaft portion 150 and a curved neck portion 152. Elongated shaft portion 150 is coupled to pivoting motor 109. Elongated shaft portion 150 passes through mounting tabs 125 and the associated bearings and/or bushings 126. Mounting tabs 125 may be welded, bolted, or otherwise attached to deck mounting plate 113. Then, elongated shaft portion transitions into curved neck portion 152. Curved neck portion 152 is then coupled to head mounting plate 117. With this configuration, rotation of elongated shaft portion 150 by pivoting motor 109 causes curved neck portion 152, head mounting plate 117 and trimmer motor 123 to rotate between and stowed position, in which trimmer motor is located above mower deck 103, and an engaged position, in which trimmer motor is located away from mower deck 103, so as to trim grass and other vegetation alongside mower deck 103. The amount of rotation of trimmer motor 123 may be selectively controlled by the amount of rotation of elongated shaft 106. This configuration is employed in all of the embodiments disclosed herein.

It is preferred that trimmer motor 123 be wired and controlled separately from arm motor 109. The wires of trimmer motor 123 either pass through the a hollow interior of pivoting arm 106 or outside of pivoting arm 106. It is preferred that the controls for arm motor 109 and trimmer motor 123 be located on or near hand controls of the mower, such as the steering levers of zero-turn mowers or the steering wheel of a riding mower. However, it will be appreciated that the controls for arm motor 109 and trimmer motor 123 may be located in other locations than the hand controls of the mower. For example, the controls for arm motor 109 and trimmer motor 123 may be formed by, disposed on, or operably associated with one or more foot pedals on the mower, or may be a stand-alone wireless controller.

In all of the embodiments disclosed herein, one or more shock absorbers, such as elastomeric members, springs, or other resilient components, may be utilized to isolate arm motor 109 from impacts generated at trimmer head 107.

Figure 2A:
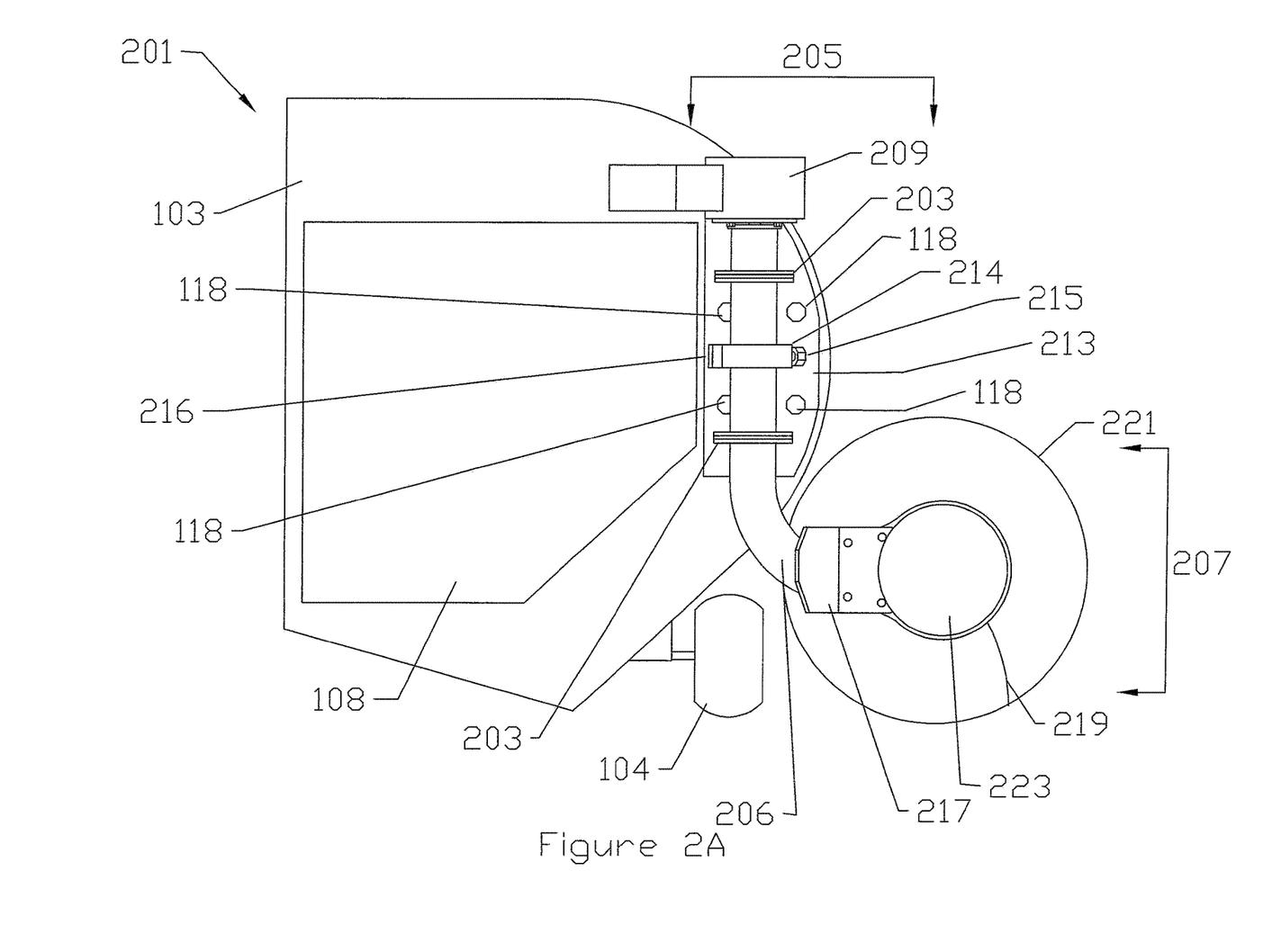
FIG. 2A is a top view of a trimmer attachment for a lawn mower according to an alternative embodiment of the present application.
Figure 2B:
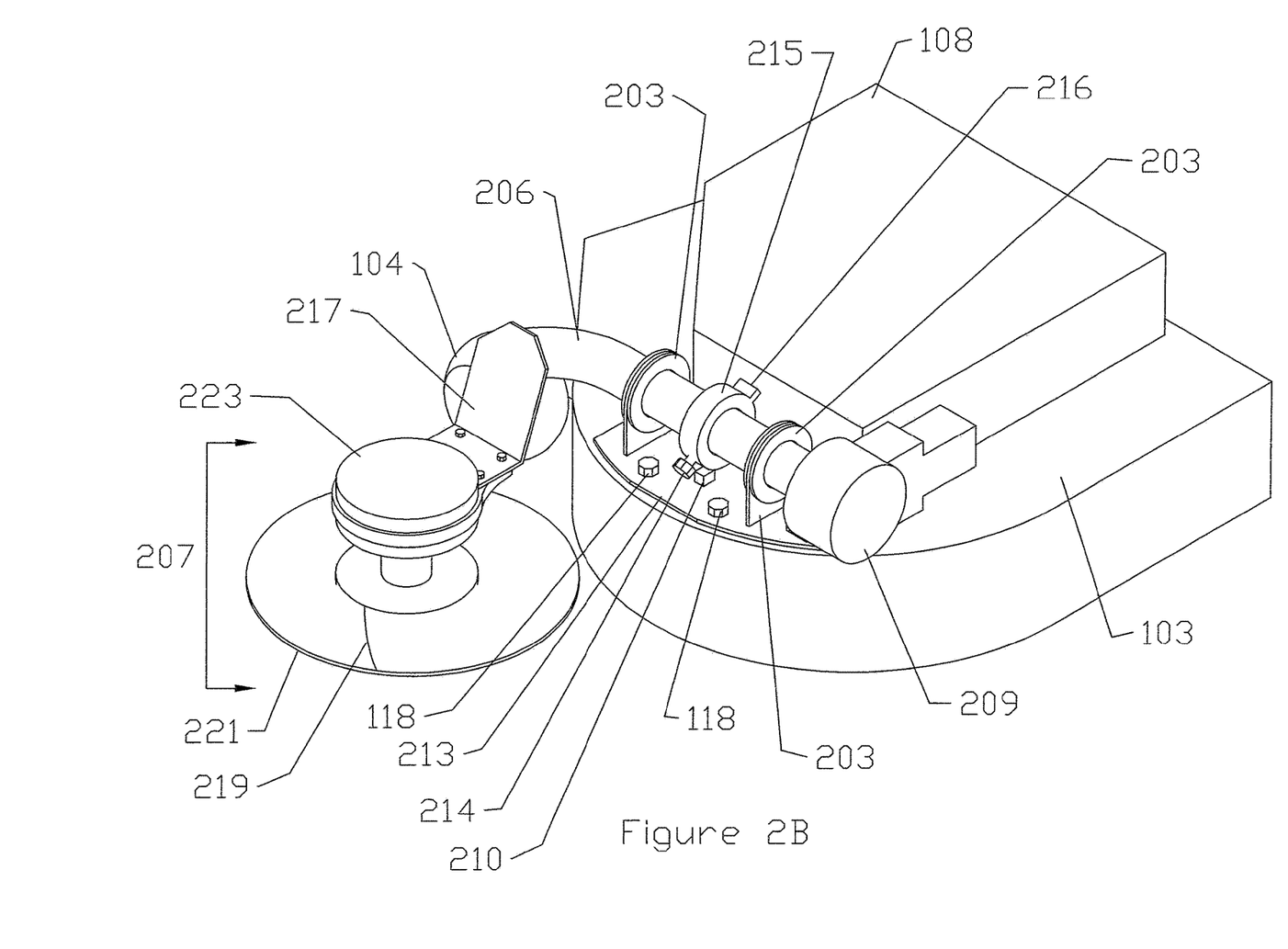
FIG. 2B is a perspective view of the trimmer attachment of FIG. 2A.

Referring now also to FIGS. 2A and 2B in the drawings, an alternative embodiment of the present application is illustrated. In this embodiment, a trimmer attachment assembly 201 is similar in form and function to trimmer attachment assembly 101, with a few exceptions. In this embodiment, a trimmer attachment 205 is secured to mower deck 103 at a deck mounting plate 213. As with the embodiment of FIGS. 1A and 1B, deck mounting plate 213 is fastened to mower deck 103 via bolts 118, or by other configurations.

Trimmer attachment 205 includes deck mounting plate 213, a head mounting plate 217, a pivoting arm 206, a trimmer head 207, one or more swing arm supports 203, an arm motor 209, at least one limit switch 210, and one or more locking collars 215. Locking collar 215 includes an adjustment screw 214. Trimmer head 207 includes a trimmer motor 223 and a trimmer line 219. A sweep path 221 illustrates the cutting area reachable by trimmer line 219. Swing arm supports 203 are generally thinner than mounting tabs 125, and preferably include bearings and/or bushings 126, which are operably associated with pivoting arm 206 to ensure that pivoting arm 206 rotates freely relative to mower deck 103. Although bushings and/or bearings 126 may help to ensure smooth movement of pivoting arm 206, it will be appreciated that bushings and/or bearings 126 are not required, and that a metal-to-metal configuration between pivoting arm 206 and mounting tabs 125 may be utilized to maintain simplicity and minimize the number of parts required for trimmer attachment 205.

In this embodiment, as with the other embodiments disclosed herein, swing arm supports 203 are preferably welded to deck mounting plate 213. However, it should be appreciated that swing arm supports 203 may be attached to deck mounting plate 213 in other ways, such as riveting or brazing. Swing arm supports 203 allow for energy from impacts to be transferred from trimmer attachment 207 to mower deck 103.

Trimmer attachment 205 includes one or more limit switches 210 and one or more limit switch strikers 216. Limit switch 210 is an up limit switch. While it is preferred that limit switch 210 is configured to prevent trimmer attachment 205 from striking mower deck 103 when pivoting to the stored position, it should be appreciated that limit switch 210 may be configured in other ways to prevent over-rotation of the trimmer attachment 205, such as setting the up limit switch 210 to stop pivoting arm 206 in a level cutting position.

Figure 3A:
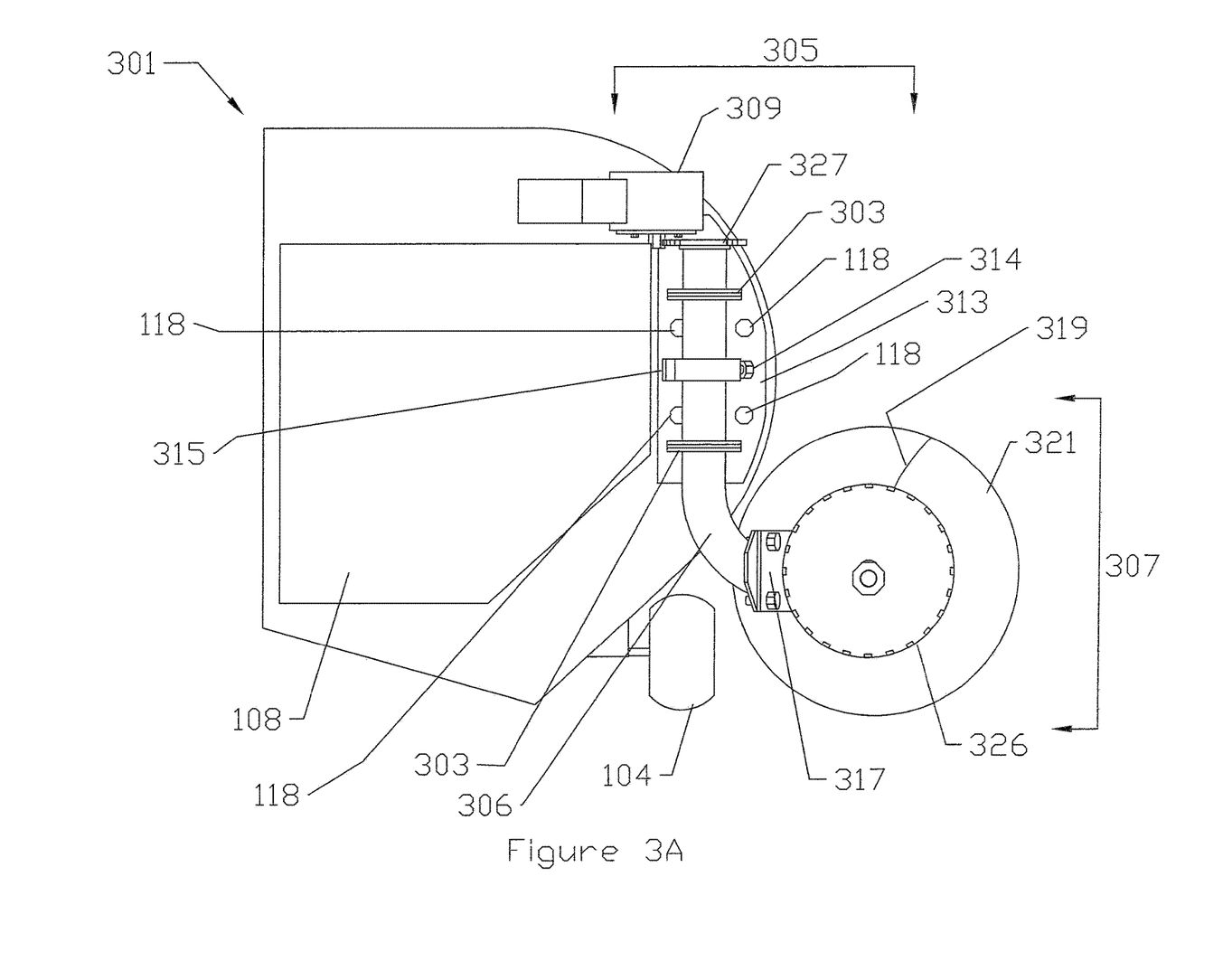
FIG. 3A is a top view of a trimmer attachment for a lawn mower according to an alternative embodiment of the present application.
Figure 3B:
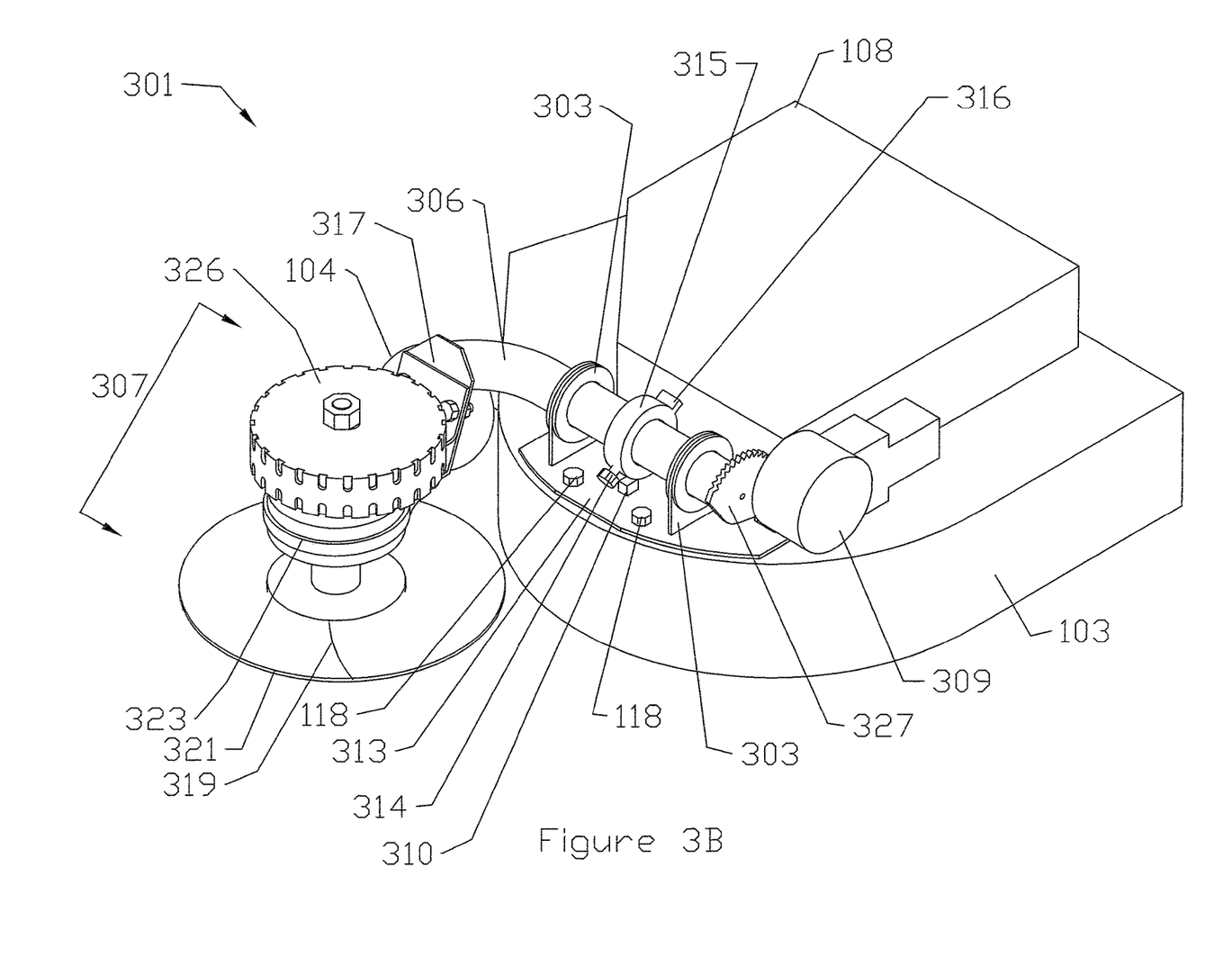
FIG. 3B is a perspective view of the trimmer attachment of FIG. 3A.

Referring now also to FIGS. 3A and 3B in the drawings, an alternative embodiment of the present application is illustrated. In this embodiment, a trimmer attachment assembly 301 is similar in form and function to trimmer attachment assembly 201, with a few additional exceptions. A trimmer attachment 305 is secured to mower deck 103 at a deck mounting plate 313. As with the embodiment of FIGS. 2A and 2B, deck mounting plate 313 is fastened to mower deck 103 via bolts 118, or by other configurations.

Trimmer attachment 305 includes deck mounting plate 313, a head mounting plate 317, a pivoting arm 306, a trimmer head 307, one or more swing arm supports 303, an arm motor 309, at least one limit switch 310, and one or more locking collars 315. Locking collar 315 includes an adjustment screw 314. Trimmer head 307 includes a trimmer motor 323 and a trimmer line 319. A sweep path 321 illustrates the cutting area reachable by trimmer line 319. Swing arm supports 303 may include bearings and/or bushings 126, which are operably associated with pivoting arm 306 to ensure that pivoting arm 306 rotates freely relative to mower deck 103.

In this embodiment, trimmer head 307 includes a rolling wheel 326. Rolling wheel 326 allows for smooth motion while running alongside objects, such fences, walls, trees, and other structures. Preferably, rolling wheel 326 rotates around a fixed position on trimmer head 307. However, it should be appreciated that rolling wheel 326 may be spring biased, such that trimmer head 307 is allowed to move slightly to prevent damage if met with a larger force.

In this embodiment, arm motor 309 includes a reduction gear 327. Although arm motor 309 includes reduction gear 327, it should be appreciated that alternative motors with varying speeds and/or operational parameters may be used, such that gear reduction is not necessary. It should be appreciated that other gear configurations could be used to best integrate with an individual mower design.

Figure 4A:
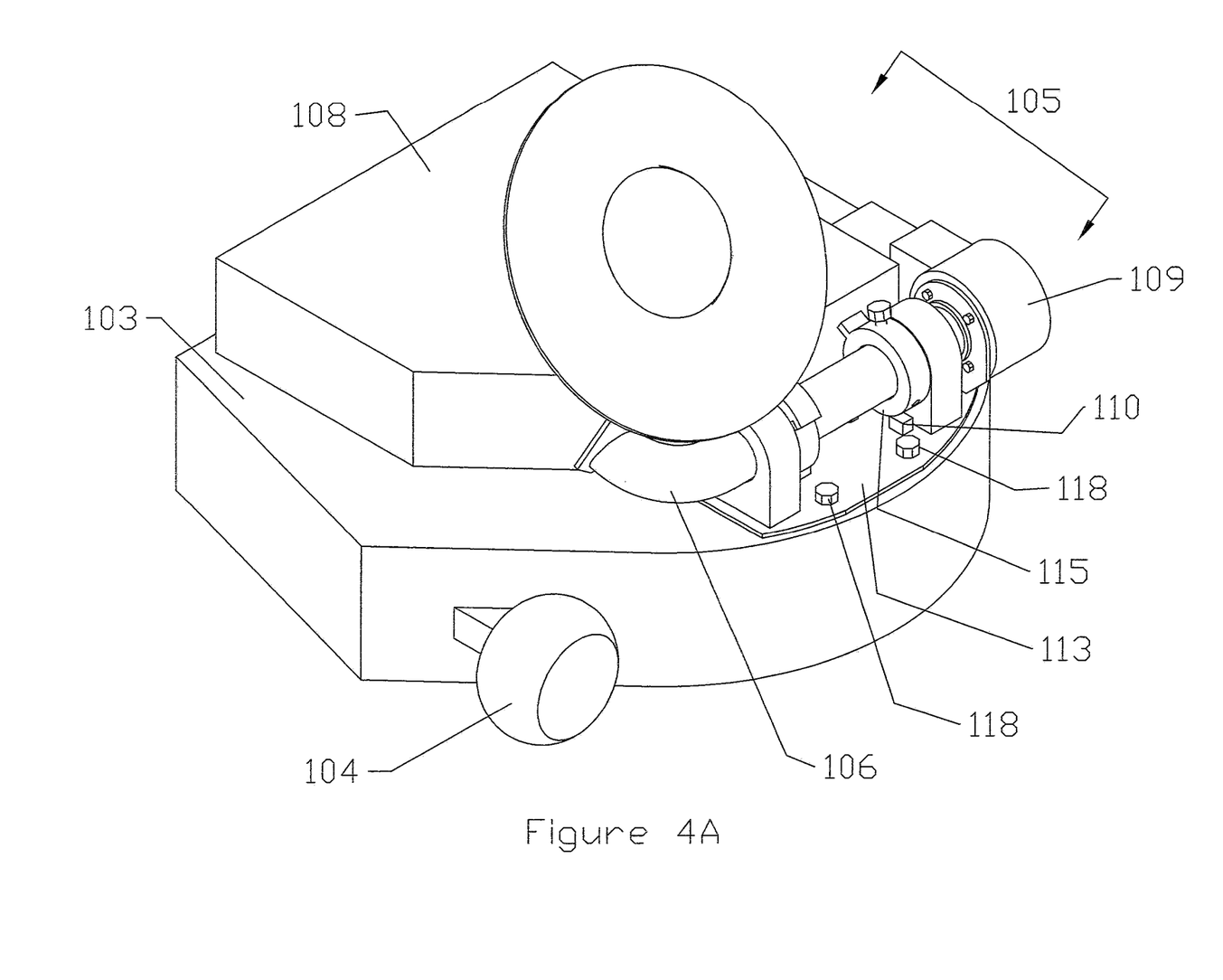
FIG. 4A is a perspective view of the trimmer attachment of FIG. 1A with the trimmer attachment in a stored position.
Figure 4B:
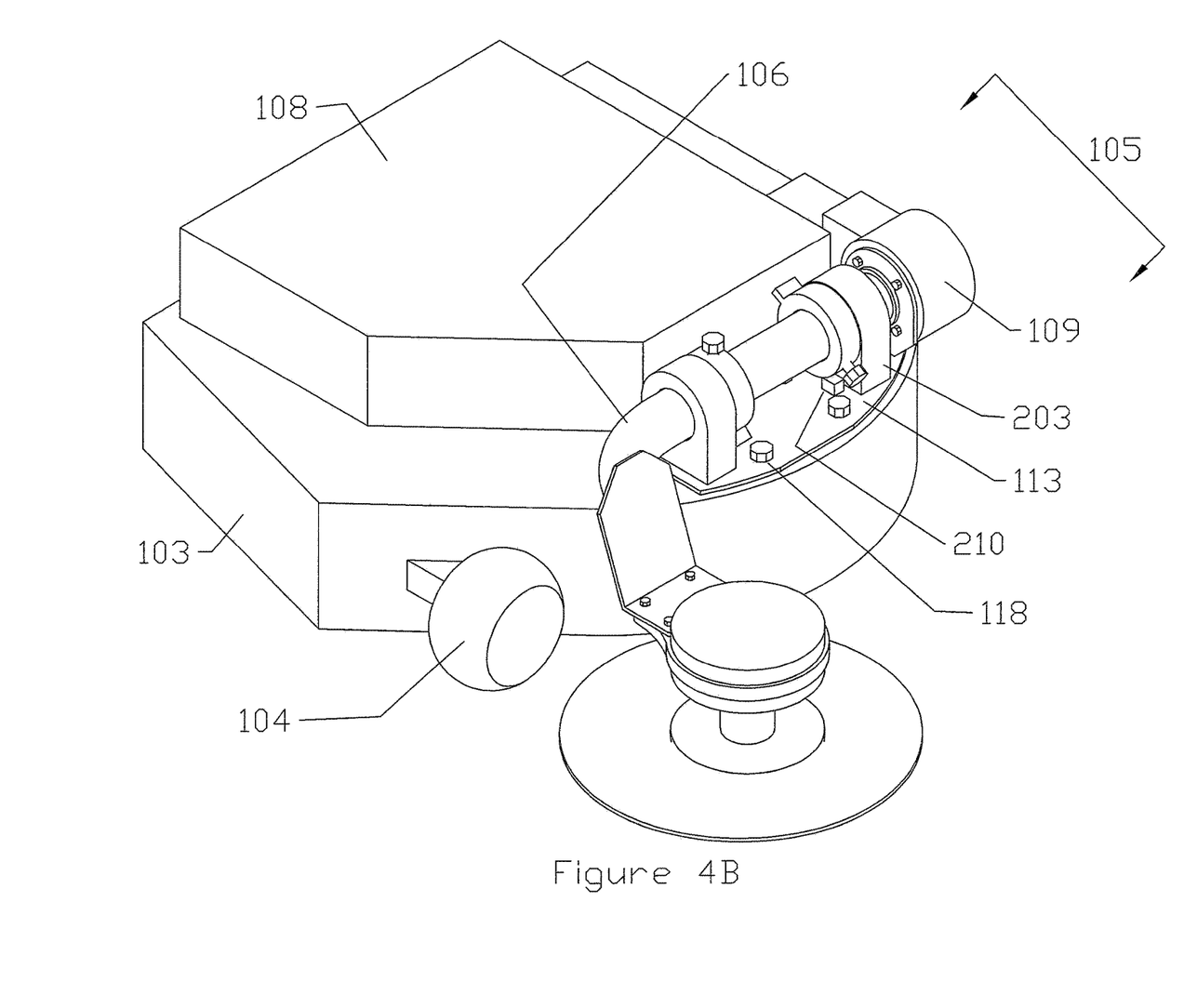
FIG. 4B is a perspective view of the trimmer attachment of FIG. 4A with the trimmer attachment in a level cutting position.
Figure 4C:
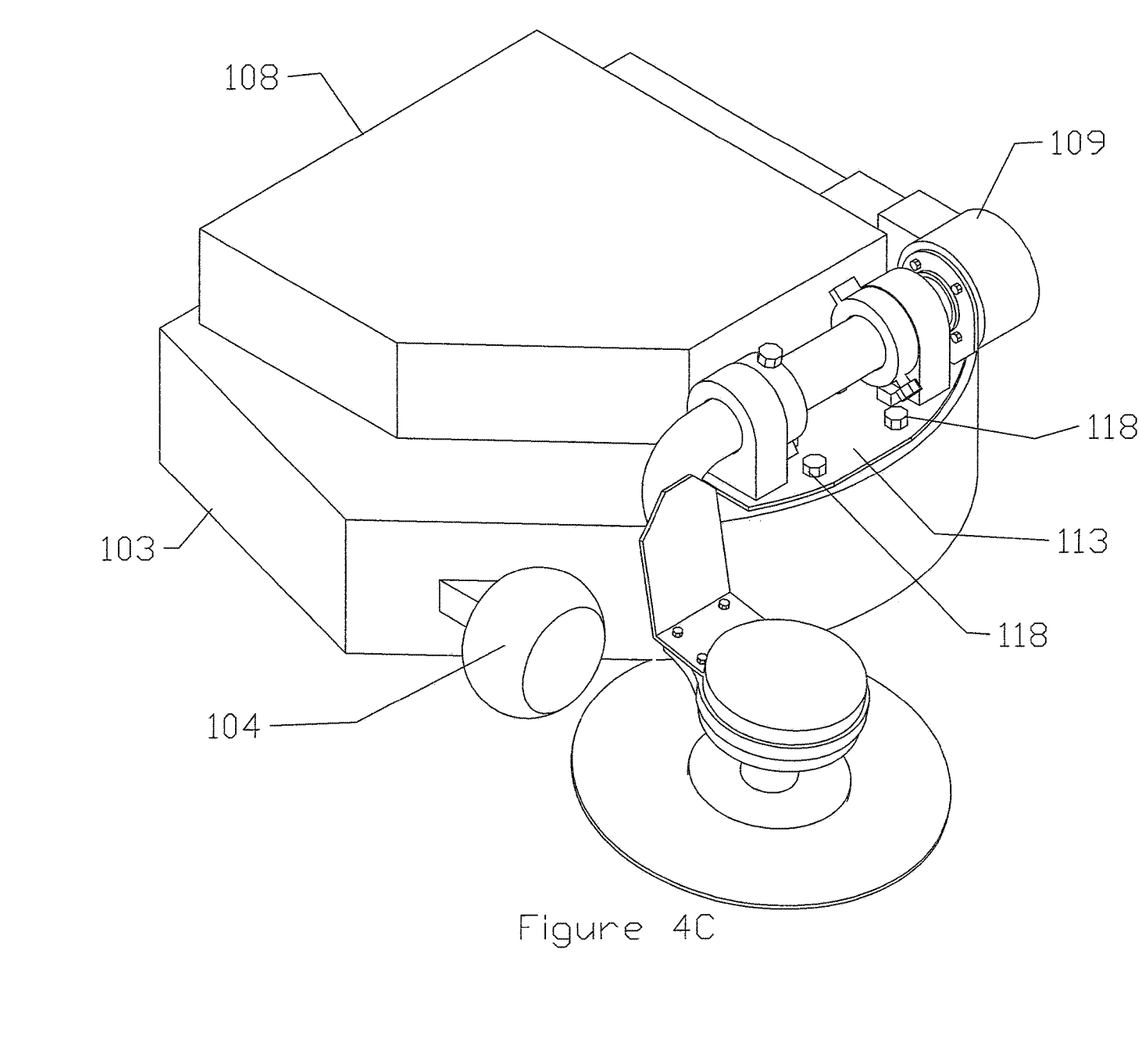
FIG. 4C is a perspective view of the trimmer attachment of FIG. 1A with the trimmer attachment in an over-rotation position.

Referring now also to FIGS. 4A, 4B, and 4C in the drawings, different positions of pivoting arm 106 of FIGS. 1A and 1B are illustrated. FIG. 4A best illustrates trimmer attachment 105 in a stored position; FIG. 4B best illustrates trimmer attachment 105 in a level cutting position; and FIG. 4C best illustrates the trimmer attachment 105 in an over-rotation position. While these positions are features of the preferred configuration, it will be appreciated that other trimmer head angles could be used to create various cutting angles that would be more advantageous to a user.

It is apparent that an invention with significant advantages has been described and illustrated. Although the present application is shown in a limited number of forms, it is not limited to just these forms, but is amenable to various changes, modifications, and combinations without departing from the spirit thereof.

What is claimed is:

1. A trimmer attachment for use with a lawn mower having a mower deck with a mower deck profile being defined by exterior edges of the mower deck, the trimmer attachment comprising:
    a deck mounting plate configured for attachment to the lawn mower;
    one or more mounting tabs extending up from the deck mounting plate;
    a curved pivoting arm rotatably coupled to the one or more mounting tabs, the pivoting arm being substantially cylindrical in shape;
    an arm motor for rotating the pivoting arm;
    a trimmer head coupled to the pivoting arm;
    one or more limit switches operably associated with the pivoting arm for stopping the rotation of the pivoting arm once a certain degree of rotation has been reached;
    one or more locking collars adjustably coupled to the pivoting arm;
    at least one limit switch striker carried by the locking collars; and
    one or more adjustment screws on each locking collar to adjust the location of the limit switch striker;
    wherein cylindrical rotation of the pivoting arm by the arm motor causes the trimmer head to rotate between a stowed position and an engaged position;
    wherein when the trimmer head is in the stowed position, no portion of the trimmer head extends beyond the mower deck profile;
    wherein the engaged position includes a plurality of positions with the trimmer head extending beyond the mower deck profile, the trimmer head being set in one of the plurality of positions by a selected pivoting arm rotation amount triggered by the arm motor; and
    wherein the pivoting arm is curved such that an end of the pivoting arm extends away from the mower deck.

2. The trimmer attachment according to claim 1, wherein the deck mounting plate is configured for attachment to the mower deck.

3. The trimmer attachment according to claim 1, wherein the deck mounting plate is bolted to the lawn mower.

4. The trimmer attachment according to claim 1, wherein the deck mounting plate is welded to the lawn mower.

5. The trimmer attachment according to claim 1, wherein the arm motor is a direct drive electric motor.

6. The trimmer attachment according to claim 1, wherein the arm motor is powered by a battery for the mower.

7. The trimmer attachment according to claim 1, further comprising:
    one or more limit switches operably associated with the pivoting arm for selectively limiting the rotation of the pivoting arm.

8. The trimmer attachment according to claim 1, further comprising:
    a rolling wheel disposed on the trimmer to absorb impact energy.

9. The trimmer attachment according to claim 1, further comprising:
    a gear reduction gear coupled to the arm motor.

10. The trimmer attachment according to claim 1, further comprising:
    one or more bearings carried by each mounting tab to reduce friction between the mounting tab and the pivoting arm.

11. The trimmer attachment according to claim 1, further comprising:
    a head mounting plate coupled to the pivoting arm for connecting the trimmer head to the pivoting arm.

12. The trimmer attachment according to claim 1, wherein the vertical height of the deck mounting plate relative to the lawn mower may be adjustable.

13. A trimmer attachment for use with a lawn mower having a mower deck with a mower deck profile being defined by exterior edges of the mower deck, the trimmer attachment comprising:
    a deck mounting plate configured for attachment to the lawn mower;
    one or more mounting tabs extending up from the deck mounting plate;
    a curved pivoting arm rotatably coupled to the one or more mounting tabs;
    an arm motor for rotating the pivoting arm;
    a trimmer head coupled to the pivoting arm;
    one or more limit switches operably associated with the pivoting arm for stopping the rotation of the pivoting arm once a certain degree of rotation has been reached;
    one or more locking collars adjustably coupled to the pivoting arm, at least one of the one or more locking collars carrying a limit switch striker; and
    one or more adjustment screws on each locking collar to adjust the location of the limit switch striker;

wherein rotation of the pivoting arm by the arm motor causes the trimmer head to rotate between a stowed position and an engaged position;

wherein when the trimmer head is in the stowed position, no portion of the trimmer head extends beyond the mower deck profile; and wherein the engaged position includes a plurality of positions with the trimmer head extending beyond the mower deck profile, the trimmer head being set in one of the plurality of positions by a selected pivoting arm rotation amount triggered by the arm motor.

* * * * *